United States Patent [19]

Hanamoto et al.

[11] Patent Number: 5,436,067
[45] Date of Patent: Jul. 25, 1995

[54] FRESHNESS KEEPING SHEET

[75] Inventors: Tetsuya Hanamoto; Eiji Tanaka, both of Okayama, Japan

[73] Assignee: Kuraray Chemical Co., Ltd., Bizen, Japan

[21] Appl. No.: 345,748

[22] Filed: Nov. 22, 1994

[30] Foreign Application Priority Data

Nov. 22, 1993 [JP] Japan .................................. 5-316100
Nov. 22, 1993 [JP] Japan .................................. 5-316101

[51] Int. Cl.⁶ ............................................. D04H 1/58
[52] U.S. Cl. .................................... 428/288; 428/296; 428/297; 428/373; 428/408
[58] Field of Search ............... 428/288, 296, 297, 408, 428/373, 283; 264/105; 426/419; 156/57, 296

[56] References Cited

U.S. PATENT DOCUMENTS

| | | | |
|---|---|---|---|
| 4,394,299 | 7/1983 | Puskas et al. | 252/447 |
| 4,467,110 | 8/1984 | Puskas et al. | 562/487 |
| 4,599,157 | 7/1986 | Suzuki et al. | 204/296 |

*Primary Examiner*—James J. Bell
*Assistant Examiner*—James J. Bell
*Attorney, Agent, or Firm*—Oblon, Spivak, McClelland, Maier & Neustadt

[57] ABSTRACT

A freshness keeping sheet comprises:

100 parts by weight of a palladium chloride-carrying activated carbon obtained by activating a carbon material under an atmosphere containing not more than 15% by volume of water vapor and cooling the activated carbon material to not more than 300° C. under the same atmosphere and then permitting the resulting activated carbon to carry 0.1 to 10% by weight of palladium chloride, and 1 to 20 parts by weight of a synthetic fiber having a single fiber diameter of 1 to 30 μm as a binder, said palladium chloride-carrying activated carbon and said synthetic fiber having been mixed and integrally molded into a sheet.

The sheet can rapidly remove thin ethylene from a gas even at low temperatures and is hence excellent as a freshness keeping sheet for refrigerators and vegetables and fruits storing boxes.

2 Claims, No Drawings

FRESHNESS KEEPING SHEET

BACKGROUND OF THE INVENTION

1. Field of the Invention

The present invention relates to freshness keeping sheets and also to a method for keeping vegetables and fruits fresh by use of the freshness keeping sheets. More specifically, the present invention relates to freshness keeping sheets obtained by adding palladium chloride having oxidation catalytic activity to activated carbon and molding the carbon into sheets, and to a method for keeping fresh, by use of the sheets, vegetables and fruits preserved in a box or a section of refrigerator for storing them.

2. Description of the Prior Art

The use of a catalyst comprising palladium chloride carried on activated carbon for oxidation of carbon monoxide or ethylene is known. In this case, particulate or granular activated carbon has been mostly used as a carrier [Nihon Kagakukaishi, p.1092–1087 (1972), Japanese Patent Publication No. 10776/1985, Japanese Patent Application Laid-open No. 55147/1981]. The present applicant has applied for patent of an activated carbon carrying palladium chloride (Japanese Patent Application No. 10776/1985 and Japanese Patent Application Laid-open No. 55147/1981). In the applications, the activated carbon to carry palladium chloride is granular and should hence be used only as packed in small bags or columns, which causes problems when used in a narrow space such as in refrigerators.

Also known is a process of permitting a honeycomb shaped activated carbon to carry palladium chloride. With this process, it is difficult to permit the honeycomb activated carbon as the carrier, having a low strength and small specific surface area, to carry a large amount of palladium chloride, and hence a high-activity palladium chloride-carrying activated carbon cannot be obtained. There are still other problems, i.e. honeycomb activated carbon is expensive and the palladium chloride-carrying honeycomb activated carbon requires forced ventilation with a fan or the like.

Let us consider the case where a freshness keeping system is, for example, used for a refrigerator. If the system requires, like in the case of conventional deodorizing systems, circulation of whole gases present in the refrigerator, an additional fan should be mounted and, at the same time, the catalytic activity for decomposing ethylene will sometimes markedly decrease due to adsorption of toxic gases generated from other foods. In order to achieve the object of keeping freshness more effectively, it is better to remove ethylene present in the very local part where it generates, such as a vegetables and fruits section in the refrigerator. This object cannot be achieved by use of the known granular palladium chloride-carrying activated carbon. This is because granular activated carbon, which should be used while being packed in a column or container, can hardly be used effectively in such a narrow place as in the refrigerator.

There has been desired, in order to remove ethylene effectively even in such narrow places, development of a shaped freshness keeping sheet obtained by molding a palladium chloride-carrying activated carbon having high performance and a large surface area, without deteriorating its performance.

A conventional process for molding activated carbon into sheets uses a liquid resin binder. This process causes the liquid to cover the pores of the activated carbon, thereby decreasing the performance markedly and preventing the activating carbon from exhibiting a high adsorbing capability inherent thereto.

One may attempt to prepare an oxidation catalyst by permitting a sheet-shaped activated carbon to carry palladium chloride. This method limits the performance of the sheet-shaped activated carbon, so that an activated carbon having a large specific surface area cannot be used. This is because activation treatment to obtain a high-performance activated carbon sheet causes the problems of crack generation, strength decrease, deformation and the like. Thus, the activated carbon sheet used for this purpose can only possess a specific surface area of about 1,000 $m^2/g$ at most and in general about 1,000 $m^2/g$.

SUMMARY OF THE INVENTION

The present invention provides a freshness keeping sheet comprising:

100 parts by weight of a palladium chloride-carrying activated carbon obtained by activating a carbon material under an atmosphere containing not more than 15% by volume of water vapor and cooling the activated carbon material not more than 300° C. under the same atmosphere and then permitting the resulting activated carbon to carry 0.1 to 10% by weight of palladium chloride, and 1 to 20 parts of a synthetic fiber having a single fiber diameter of 1 to 30 μm as a binder, said palladium chloride-carrying activated carbon and said synthetic fiber having been mixed and integrally molded into a sheet.

The freshness keeping sheet of the present invention, having been molded from a palladium chloride-carrying activated carbon with high oxidation catalytic activity, without decreasing its performance, can remove thin ethylene present in gases even at low temperatures and therefore is excellent in keeping fresh vegetables and fruits stored in vegetables and fruits storing boxes or vegetables and fruits storing sections of refrigerators.

DETAILED DESCRIPTION OF THE PREFERRED EMBODIMENTS

The present inventors made an extensive study, in order to remove thin ethylene even at low temperatures, on ethylene removing materials carrying palladium chloride that has excellent oxidation catalytic activity and being suitable for use in narrow spaces such as the inside of vegetables and fruits storing boxes or vegetables and fruits storing sections of refrigerators. As a result, it was found that a molded article comprising an activated carbon obtained by a specific process and carrying palladium chloride and having a specific composition maintains a high catalytic activity. It was also found that the use of this type of molded sheet can remove ethylene having a low concentration of about 10 ppm at a low temperature range of 0° to 40° C.

Thus, the present invention provides a freshness keeping sheet comprising:

100 parts by weight (hereinafter simply referred to as "parts") of a palladium chloride-carrying activated carbon obtained by activating a carbon material under an atmosphere containing not more than 15% by volume of water vapor and cooling the activated carbon material not more than 300° C. under the same atmosphere and then permitting the resulting activated carbon to carry 0.1 to 10% by weight of palladium chloride, and 1 to 20 parts of a synthetic fiber having a single fiber diameter of 1 to 30 μm as a binder, said palladium chloride-carrying activated carbon and said synthetic fiber having been mixed and integrally molded into a sheet.

The present invention also provides a freshness keeping sheet comprising:

100 parts of a palladium chloride-carrying activated carbon obtained by heat treating an activated carbon obtained by the usual process or a used activated carbon with decreased oxidation catalytic activity, at a temperature of at least 500° C. under an atmosphere of nitrogen and/or carbon dioxide containing substantially no oxygen or water vapor, cooling the heat treated activated carbon to not more than 300° C. under the same atmosphere and then permitting the resulting body to carry 0.1 to 10% by weight of palladium chloride, and 1 to 20 parts of a synthetic fiber having a single fiber diameter of 1 to 30 μm as a binder, said palladium chloride-carrying activated carbon and said synthetic fiber having been mixed and integrally molded into a sheet.

The present invention further provides a process for keeping freshness which comprises placing either one of the above sheets as it is or as packed in a nonwoven fabric bag, in a vegetables and fruits storing box or in a vegetables and fruits storing section of a refrigerator.

The term "an atmosphere containing substantially no oxygen or water vapor" means an atmosphere which causes, when an activated carbon is heat treated thereunder, the treated activated carbon to have no oxygen atom bonded to the surface thereof, and in general includes atmospheres containing less than 1 to 2% of oxygen or water vapor.

The activated carbon used in the present invention is obtained by carbonizing and activating a carbon material of coconut shell charcoal or coal under the conditions according to the present invention.

On the activation, it is necessary that the activating gas, which contains, besides water vapor, carbon dioxide and nitrogen, contains not more than 15% by volume of water vapor. Gases conventionally used for activating carbon contain 40 to 60% by volume, or often higher than this range, of water vapor. This is because the composition of an activating gas is generally set such that the partial pressure of water vapor becomes as high as possible, since the rate of activation of carbon materials with water vapor is much higher than that with carbon dioxide. Accordingly, the condition employed in the present invention, maintaining the rate of activation at a low level, is far milder as compared to the usual process. As is apparent from Example 12 and Comparative Examples 12-14 of Table 5 and Example 23 and Comparative Examples 25-27 of Table 9, activated carbons treated under a condition of high water vapor content clearly decrease their oxidation catalytic activity for ethylene. The mechanism involved in low water-vapor-content activation conditions increasing the oxidation catalytic activity of the obtained activated carbon is not quite clear. However, it has been pointed out that with granular activated carbons obtained under such conditions, there are present no oxygen atoms bonded to the surface thereof.

Conventional activated carbons are produced by activating a carbon material with a gas having a high water vapor content, such as water vapor or combustion gas. These activated carbons, if used in the present invention, will not show a sufficient oxidation catalytic activity. The effect of the present invention can only be produced by using a sheet-shaped palladium chloride-carrying activated carbon obtained by molding, by use of a specific binder, a carbon material activated with a gas having the above described specific composition and then permitted to carry palladium chloride.

The freshness keeping sheet thus obtained shows a strong catalytic activity capable of rapidly oxidizing ethylene. However, prior to this carrying process, if the carbon material used in the present invention is, after activation treatment, taken out as it is at a high temperature from the system and allowed to stand under an atmosphere containing a large amount of water vapor, hydrogen or oxygen, the resulting activated carbon will markedly decrease its oxidation catalytic activity.

It is necessary to cool the activated carbon down to a temperature of not more than 300° C. under a similar gaseous atmosphere to one where the activation has been effected, and thereafter to take it out from the system. The term "similar gaseous atmosphere to one where the activation has been effected" herein means that the atmosphere may contain nitrogen, carbon dioxide or mixtures thereof and contains substantially no oxygen or water vapor, and does not necessarily mean that the gases used for the activation and for the cooling are of the same composition. The term "cooling under the same atmosphere" used in the present invention means "cooling under a similar gaseous atmosphere as explained above".

If the activated carbon is, after activation and as it has a temperature of at least 300° C., taken out into the air, the oxidation catalytic activity for ethylene will markedly decrease. Examples 9-10 and Comparative Example 9 (after being activated, cooled in the air by the usual process) of Table 3 show the influence of nitrogen and air under which cooling is effected after activation on the catalytic activity. Example 11 and Comparative Examples 10-11 of Table 4 and Example 21-22 and Comparative Examples 23-24 of Table 8 show the influence of the temperature at which the activated carbon contacts the air.

It is desirable that activated carbon thus obtained have a specific surface area of at least 1,200 m$^2$/g, more preferably at least 1,400 m$^2$/g.

Further in the present invention, waste activated carbons having been once prepared as oxidation catalyst and having decreased their catalytic activity because they had contacted air or the like to have their surface oxidized, or activated carbons obtained by the usual process, can also become usable, by specific treatments, as carriers of palladium chloride having high oxidation activity for ethylene of the same degree as that of the above activated carbon used in the present invention. The treatments comprise heating at at least 500° C. these activated carbons under an atmosphere of nitrogen and/or carbon dioxide containing substantially no oxygen or water vapore and then cooling the heated carbons down to a temperature of not more than 300° C. under the same atmosphere. In other words, the above treatments provides the resulting activated carbons with a latent oxidation catalytic activity. The activated carbons to be heat treated may be those obtained from any material such as coal or coconut shell charcoal and may have any shape with no particular limitation.

In the above description, the term "activated carbons obtained by the usual process" means those activated carbons that have been obtained by the usual process of activating carbon materials under an atmosphere containing water vapor in an amount considerably higher than 15% by volume and, after completion of the activation, taking them out from the activation furnace to contact them with air as they have a temperature of at least 500° C. As the water vapor content increases, the size of micropores of the resulting activated carbons tend to increase. Contacting carbon materials having been activated to air, without sufficiently cooling them under the same atmosphere., results in an increase in the amount of oxygen bonded to the surface of the activated carbons.

In other words, activated carbons obtained by the usual process can be converted by the above treatments into carriers usable for the oxidation catalysts according to the present invention. For this treatments, the heat treatment temperature should be at least 500° C., and the heat treatment time, which depends on the temperature, is generally 20 to 180 minutes at a temperature of 500° C. and a few minutes at 800° C., whereby sufficient effect is produced. Examples 2 and 3 and Comparative Examples 1-2 of Table 1, and Examples 14-15 and Comparative Examples 15-16 of Table 6 show the influence of the heat treatment temperature on the resulting oxidation catalytic activity.

It is necessary that the activated carbon carrier used in the present invention be permitted to carry 0.1 to 10% of palladium chloride. For this purpose, there can be employed a process which comprises dissolving a prescribed amount of palladium chloride in an aqueous hydrochloric acid solution having a concentration of 0.1 to 3 normal, preferably 0.5 to 1 normal, immersing an activated carbon in the obtained solution, stirring the mixture to make the carbon adsorb the palladium chloride sufficiently, removing the remaining liquid and drying the activated carbon at about 200° C. Palladium chloride should be contained in an amount of 0.1 to 10% and preferably in an amount of 0.5 to 2%.

If the content of palladium chloride is less than 0.1%, the catalytic activity will be insufficient. If the content exceeds 10%, the catalytic activity will no longer increase linearly. Moreover, such a large use of expensive palladium chloride is uneconomical. The content of palladium chloride is adjusted by changing the ratio between the concentration of palladium chloride in the aqueous hydrochloric acid solution used and the amount of the activated carbon to be immersed therein. In general, the palladium chloride present in the solution is almost completely adsorbed in the activated carbon.

In order to molding the palladium chloride-carrying activated carbon thus obtained into sheets, their grain size can be in a range of 0.1 μm to 6 mm and is selected according to the purpose of the resulting sheets.

Any synthetic fiber that can, when mixed with the granular activated carbon, heated and pressed, form molded products may be used as the binder for the purpose of the present invention. For example, fibers from thermoplastic resins, thermosetting resins, hydrophilic resins, conductive resins and the like that can fuse upon heating without water or organic solvents are suitable for this purpose.

Examples of usable thermoplastic resins are polyethylene, polypropylene, ABS (acrylonitrile-butadienestyrene resin), PET (polyethylene terephthalate), nylons, PBT (polybutylene terephthalate), ethylene-acrylic resin, PMMA (polymethyl methacrylate) and mesophase pitch.

Examples of usable thermosetting resins are furan resins and phenol resins, and those of hydrophilic resins are polyvinyl alcohol and ethylene-vinyl alcohol copolymer.

It is necessary that the synthetic fiber used as the binder have a single fiber diameter of 1 to 30 μm and preferably 5 to 20 μm. If the diameter is less than 1 μm, the resulting molded sheets will have a large bulk density, thereby hardly achieving a high strength and high density. If the diameter exceeds 30 μm, the adhesiveness will decrease so that high-strength molded sheets cannot be obtained. Examples 4–5 and Comparative Examples 4–5 of Table 2, and Examples 16–17 and Comparative Examples 18–19 of Table 7 show the influence of the single fiber diameter of the synthetic fibers used on the strength of the resulting molded sheets.

It is necessary that the amount of the synthetic fiber used be 1 to 20 parts based on 100 parts of the activated carbon, preferably 2 to 15 parts on the same basis. An amount of the synthetic fiber of less than 1 part causes the resulting molded sheets to be of insufficient strength. On the other hand, an amount of the synthetic fiber exceeds 20 parts, which covers the surface of the activated carbon, decreases the catalytic activity. Examples 6–8 and Comparative Examples 6–7 of Table 2 and Examples 18–20 and Comparative Examples 20–21 of Table 7 show the influence of the amount of synthetic fibers used on the strength and catalytic activity of the obtained molded sheets.

Besides, a reinforcing material may, as necessary, used for reinforcing the molded sheets. Preferred examples of reinforcing materials are fibers of metals e.g. titanium, aluminum, iron, copper, brass and stainless steel and inorganic fibers, e.g. silicon carbide, boron nitride, barium titanate, glass fiber, carbon fiber and activated carbon fiber. These materials increase the strength of the molded sheets.

It is desirable that the reinforcing material used be short cut fibers of monofilament and multifilament, having a length of 0.2 to 20 mm and a diameter of 3 to 100 μm. The reinforcing fibers may be used in an amount of 1 to 10 parts based on 100 parts of the molded sheets, preferably 3 to 17 parts on the same basis. If required, a particulate polymer can be used in combination as a binder. Before being molded into sheets, the activated carbon is mixed with a synthetic fiber and others by any conventional mixing method, such as with a mixer, ribbon mixer, static mixer, ball mill, sample mill or kneader. Upon the mixing, simple mixing can adhere the synthetic fiber to the surface of the activated carbon to some extent. However, it is recommended to heat them beforehand in order to strengthen the adhesion between the synthetic fiber and the activated carbon. Examples of heat sources usable for this purpose are microwave, infrared rays, far-infrared rays and high frequency wave. During mixing, heating with generating static charge can adhere the synthetic fiber to the surface of the activated carbon more firmly.

A mold having the desired sheet shape is filled with the obtained mixture. The mixture is then compression molded by heating to a temperature above the softening point of the binder fiber and pressing under a pressure of 0.1 to 10 kg/cm², followed by cooling, to give the freshness keeping sheet according to the present invention.

It is known that presence of a trace amount of ethylene generated from vegetables or fruits with these plants accelerates their growth and ripeness. It is also known that removal of ethylene generated from vegetables or fruits suppresses their growth or ripeness, thereby producing the effect of keeping them fresh.

The freshness keeping sheets of the present invention have excellent ethylene removing function and, in particular, are characterized by the ability to remove trace amount of ethylene in gases nearly completely. The sheets are therefore effective for all the vegetables and fruits for which ethylene acts as a growth hormone. Accordingly, the sheets are effective for keeping fresh the contents of vegetables and fruits storing boxes or vegetables and fruits storing sections of refrigerators, in particular the latter, since the sheets also have excellent removing function for trace ethylene at low temperatures of 0° to 5° C.

The sheets of the present invention, having a sheet-like shape, can be suitably inserted into narrow spaces in vegetables and fruits storing boxes or vegetables and fruits storing sections of refrigerators. Depending on the inside state of these storing containers or on the shape of vegetables or fruits stored therein, the freshness keeping sheets may contact the vegetables or fruits directly. To avoid the contact, the freshness keeping sheet can be used as packed in a gas permeable bag.

As is apparent from comparison of Example 21 with Example 22, the use of the freshness keeping sheet of the present invention as packed in a nonwoven fabric bag having a high gas permeability exhibits almost the same freshness keeping function as compared to the use of the sheet as it is.

EXAMPLES

Other features of the invention will become apparent in the course of the following descriptions of exemplary embodiments which are given for illustration of the invention and are not intended to be limiting thereof.

Examples 1–3 and Comparative Examples 1–3

In Example 1, coal granules of 10 to 30 mesh was carbonized at 800° C. and then activated with combustion gas of liquefied petroleum gas (composition: nitrogen 80%, oxygen 0.2%, carbon dioxide 9.8% and water vapor 10%) at 900° C. to a specific surface area of 1,300 m$^2$/g. The activated carbon was taken out into a container the air of which had been replaced by nitrogen and allowed to cool therein to a temperature below 300° C., to give an activated carbon carrier.

In Comparative Example 1, the carbon activated to a specific surface area of 1,300 m$^2$/g in the same manner as in Example I was taken out into a nitrogen atmosphere, cooled therein to 500° C., and taken out into air and allowed to cool, to give an activated carbon carrier. Part of the activated carbon carrier obtained in Comparative Example 1 was treated in a stream of a 50/50 by volume mixed gas of N$_2$ and CO$_2$ at 700° C. for 10 minutes, and taken out into a nitrogen atmosphere and allowed to cool to a room temperature, to give an activated carbon carrier (Example 2). Another part of the activated carbon carrier of Comparative Example 1 was also treated in nitrogen at 900° C. for 5 minutes and cooled in nitrogen to a room temperature to give an activated carbon carrier (Example 3).

These activated carbons were permitted to carry palladium chloride in the following manner. 50 g of each of the activated carbon carriers was added to 200 ml of 0.5N hydrochloric acid containing 500 mg of palladium chloride. The mixtures were stirred sufficiently and allowed to stand for 3 hours. Solid matters were collected by removing the remaining solution, washed with pure water and dried at 200° C., to give palladium chloride-carrying activated carbons having a palladium chloride content of 1.0%.

The palladium chloride-carrying activated carbons thus obtained were each pulverized into particles having a diameter of 0.1 to 1 mm. To 100 parts of each of these palladium chloride-carrying activated carbons, 10 parts of polyethylene fibers having a diameter of 10 microns and a length of 3 mm was added and mixed sufficiently. The mixtures were pressed under heating into sheets having a thickness of 3 mm.

One gram each of the molded sheets thus obtained were fixed beneath the ceiling of a box of 1 m × 1 m × 1 m and tested for capability of removing ethylene.

The concentration of ethylene, initially 100 ppm, was measured at time intervals. The results are shown in Table 1.

TABLE 1

| | activated carbon | specific surface (m$^2$/g) | cooling gas | PdCl$_2$ (%) | time elapsed and concentration of ethylene (ppm) | | | | | | | | |
|---|---|---|---|---|---|---|---|---|---|---|---|---|---|
| | | | | | 0' | 5' | 10' | 30' | 60' | 120' | 240' | 480' | 24 hr |
| Example 1 | coal base, AC. sheet | 1300 | N$_2$ | 1.0 | 100 | 70 | 51 | 27 | 13 | 0.1 | 0 | 0 | 0 |
| C. Example 1 | coal base, AC. sheet | 1300 | air | 1.0 | 100 | 93 | 87 | 75 | 54 | 42 | 32 | 19.3 | 8.5 |
| Example 2 | C. Ex. 1, heat treat 700° C., N$_2$ + CO$_2$ | 1300 | N$_2$ | 1.0 | 100 | 76 | 72 | 49 | 25 | 12 | 0.1 | 0 | 0 |
| Example 3 | C. Ex. 1, heat treat 900° C., N$_2$ + CO$_2$ | 1300 | N$_2$ | 1.0 | 100 | 72 | 49 | 25 | 12 | 0.1 | 0 | 0 | 0 |
| C. Example 2 | commercially available AC. | 1500 | air | — | 100 | 96 | 90 | 83 | 72 | 65 | 43 | 36 | 31 |
| C. Example 3 | commercially available AC. | 900 | air | 1.0 | 100 | 90 | 85 | 77 | 68 | 60 | 42 | 35 | 30 |

Note)
AC: activated carbon.

In the table, Comparative Example 2 utilized a commercially available activated carbon having a specific surface area of 1,500 m$^2$/g and obtained by the usual process as it was, without palladium chloride; and Comparative Example 3 used another commercial sheet-shaped activated carbon with 1.0% of palladium chloride carried thereon.

The palladium chloride-carrying activated carbon sheets according to the present invention (Examples 1–3) all removed ethylene completely in a short period of time, thus showing excellent removing ability. On the other hand, as shown in Comparative Examples 1–3, sheets utilizing the activated carbon carrier other than those of the present invention and commercially available activated carbon all had a low rate of ethylene removal. In particular, one comprising the commercially available sheet-shaped activated carbon, having a small specific surface area, was slow even with palladium chloride carried thereon.

Examples 4–8 and Comparative Examples 4–8

Example 1 was repeated except that the type of activated carbon and the diameter and mixing ratio of synthetic fibers as binder were changed as shown in Table 2, to obtain palladium chloride-carrying molded activated carbon sheets. The relationship between the time elapsed and the ethylene concentration was studied in the same manner. The results are shown in Table 2.

Examples 9–10 and Comparative Example 9

Palladium chloride-carrying activated carbon sheets according to the present invention were prepared as shown in Table 3. For comparison purpose, a palladium chloride-carrying activated carbon sheet was prepared from a commercially available activated carbon. One gram each these sheets were tested for ethylene removing rate at low temperatures in the same manner as in Example 1.

The results of the test and specifications of the samples given in Table 3 show apparently that the palladium chloride-carting activated carbon sheets according to the present invention (Exsample 9–10) remove all ethylene very fast even at low temperatures.

TABLE 3

| | activated carbon | specific surface (m²/g) | activation gas | cooling gas | PdCl₂ (%) | decomposing Temp. (°C.) | time elapsed and concentration of ethylene (ppm) | | | | | | | | |
|---|---|---|---|---|---|---|---|---|---|---|---|---|---|---|---|
| | | | | | | | 0' | 5' | 10' | 30' | 60' | 120' | 240' | 480' | 24 Hr |
| Example 9 | coal base AC. | 1500 | LPG-combust. gas | N₂ | 1.0 | 5.0 | 100 | 87 | 71 | 55 | 42 | 33 | 7 | 2 | 0 |
| Example 10 | coconut base AC. | 1400 | CO₂ 50% + N₂ 50% | N₂ | 1.0 | 1.0 | 100 | 91 | 78 | 63 | 54 | 36 | 19 | 5 | 0 |
| C. Example 9 | commercially available AC. | 900 | — | air | 1.0 | 5.0 | 100 | 96 | 91 | 84 | 79 | 73 | 68 | 49 | 23 |

Note:
AC.: activated carbon. LPG: liquefied petroleum gas. combust. gas: combution gas.

TABLE 2

| | activated carbon | binder (fiber) (%) | dia. (μm) | flexural strength (kg/cm²) | time elapsed and concentration of ethylene (ppm) | | | | | | | |
|---|---|---|---|---|---|---|---|---|---|---|---|---|
| | | | | | 0' | 5' | 10' | 30' | 60' | 120' | 240' | 480' | 24 hr |
| Example 4 | coal base | PE 10 | 18 | 1.0 | 100 | 85 | 76 | 60 | 42 | 22 | 5 | 0 | 0 |
| Example 5 | coconut base | PE/PP 15 | 15 | 1.2 | 100 | 87 | 80 | 65 | 47 | 25 | 8 | 0.2 | 0 |
| C. Example 4 | coal base | PE 10 | 100 | 0.15 | 100 | 86 | 75 | 61 | 40 | 21 | 5 | 0.1 | 0 |
| C. Example 5 | coconut base | PE/PP 15 | 50 | 0.2 | 100 | 83 | 77 | 63 | 45 | 23 | 7 | 0.1 | 0 |
| Example 6 | coal base | PP 5 | 8 | 0.9 | 100 | 81 | 62 | 53 | 29 | 13 | 2.5 | 0.1 | 0 |
| Example 7 | coal base | PE/PET 5 | 10 | 1.1 | 100 | 80 | 63 | 52 | 31 | 14 | 3.3 | 0.1 | 0 |
| Example 8 | coal base | PE/nylon 3 | 25 | 1.8 | 100 | 75 | 65 | 54 | 10 | 1.9 | 0 | 0 | 0 |
| C. Example 6 | coal base | PP 40 | 8 | 3.5 | 100 | 90 | 82 | 75 | 63 | 54 | 33 | 18.1 | 0.9 |
| C. Example 7 | coal base | PE/PET 40 | 10 | 3.4 | 100 | 89 | 80 | 70 | 65 | 52 | 31 | 19.2 | 0.9 |
| C. Example 8 | coal base | SBR latex 30 | — | 2.8 | 100 | 95 | 89 | 81 | 73 | 62 | 49 | 21 | 14.3 |

Note)
dia.: diameter. PE: polyethylene fiber. PE/PP: polyethylene polypropylene conjugate fiber. PP: polypropylene fiber. PE/PET: polyethylene polyethylene terephthalate conjugate fiber. PE/nylon: polyethylene nylon conjugate fiber. SBR latex: styrene buthadiene rubber latex.

In Table 2, Comparative Example 8 used as binder an SBR latex instead of synthetic fibers.

As is apparent from Table 2, the palladium chloride-carrying activated carbon sheets according to the present invention all had a high oxidation catalytic activity and high flexural strength. On the other hand, those utilizing a binder fiber having a diameter of at least 30 μm (Comparative Examples 4–5) had too low a strength to be usable for practical purposes, and those utilizing a binder in an amount exceeding 20 parts (Comparative Examples 6–7) had a markedly decreased ethylene removing rate.

Example 11 and Comparative Examples 10–11

Example 1 was repeated except that the temperature at which each of the carbons activated was, after cooling, taken out into air was changed, to obtain activated carbons. The activated carbons were permitted to carry 1% of palladium chloride in the same manner as in Example 1 and then molded into sheets, to give palladium chloride-carrying activated carbon sheets. They were tested for the relationship between the time elapsed and the ethylene concentration.

The results of the test and specifications of the samples are shown in Table 4.

TABLE 4

| | activated carbon | specific surface (m²/g) | activation gas | cooling gas | PdCl₂ (%) | Temp. taken out in air (°C.) | time elapsed and concentration of ethylene (ppm) | | | | | | | | |
|---|---|---|---|---|---|---|---|---|---|---|---|---|---|---|---|
| | | | | | | | 0' | 5' | 10' | 30' | 60' | 120 | 240 | 480 | 24 hr |
| C. Example 10 | coal-base | 1450 | LPG-combust. gas | N₂ | 1.0 | 400 | 100 | 97 | 92 | 80 | 65 | 60 | 50 | 43 | 30 |
| C. Example 11 | coconut-base | 1450 | LPG-combust. gas | N₂ | 1.0 | 350 | 100 | 95 | 90 | 75 | 61 | 54 | 47 | 39 | 25 |
| Example 11 | coal- | 1450 | LPG- | N₂ | 1.0 | 300 | 100 | 82 | 66 | 48 | 37 | 20 | 7 | 0.6 | 0 |

TABLE 4-continued

| activated carbon | specific surface (m²/g) | activation gas | cooling gas | PdCl₂ (%) | Temp. taken out in air (°C.) | time elapsed and concentration of ethylene (ppm) | | | | | | | | |
|---|---|---|---|---|---|---|---|---|---|---|---|---|---|---|
| | | | | | | 0' | 5' | 10' | 30' | 60' | 120 | 240 | 480 | 24 hr |
| base | | combust. gas | | | | | | | | | | | | |

Note:
AC.: activated carbon. LPG: liquefied petroleum gas. combust. gas: combution gas.

As is understood from Table 4, the performance of palladium chloride-carrying activated carbon sheets depends on the temperature at which the carbons having been activated and cooled contact air for the first time. The ethylene removing ability decreases to a large extent with the temperature exceeding 300° C.

Example 12 and Comparative Examples 12–14

Activation of coal powder was conducted at 900° C. to a specific surface area of 1,000 m²/g in various activation gases with different water vapor pressures. Each of the activated carbon powders thus obtained were taken out into a container the air in which had been replaced by nitrogen and allowed to cool in the nitrogen to less than 300° C. The activated carbon powders were then permitted to carry 1.0% of palladium chloride and molded in the same manner as in Example 1, to give palladium chloride-carrying activated carbon sheets.

They were tested for the relationship between the time elapsed and the ethylene concentration.

The results of the test and specifications of the samples are shown in Table 5.

Examples 13–15 and Comparative Examples 15–17

In Example 13, 10 g of the 3-mm thick palladium chloride-carrying activated carbon sheet obtained in Example 1 was, together with 8 kg of FUJI apples, placed in a 40-liter vegetables and fruits section of a refrigerator and tested for its freshness keeping capability.

Table 6 shows the results of ethylene concentration measurement and quality evaluation of the apples, after 14 days. The hardness of an apple was determined by a method generally employed in the vegetables and fruits industry and from a stress-strain curve obtained by contacting a plunger at a constant speed, in terms of a load under which the skin of the apple broke. The degree of sugar means a total content (%) of sucrose, fructose and glucose determined in accordance with Food Analysis Methods.

The taste was organoleptically tested on each apple by 5-stage rating with numeral 5 being excellent and 1 being worst and expressed in terms of the average. "Mitsuiri" (sweetness) and "Yakebyo" (a degraded symptom of apple) and browning and core-browning were expressed in terms of the ratio (%) based on the total number.

TABLE 5

| | activated carbon | specific surface (m²/g) | activation gas H₂O:CO₂:N₂:O₂ | cooling gas | PdCl₂ (%) | time elapsed and concentration of ethylene (ppm) | | | | | | | | |
|---|---|---|---|---|---|---|---|---|---|---|---|---|---|---|
| | | | | | | 0' | 5' | 10' | 30' | 60' | 120' | 240' | 480' | 24 Hr |
| Example 12 | coconut-base | 1450 | 14:25:60.9:0.1 | N₂ | 1.0 | 100 | 72 | 57 | 35 | 14 | 0.3 | 0 | 0 | 0 |
| C. Example 12 | coconut-base | 1450 | 17:22:60.8:0.2 | N₂ | 1.0 | 100 | 91 | 80 | 65 | 50 | 38 | 33 | 15 | 0.3 |
| C. Example 13 | coconut-base | 1450 | 20:19:60.9:0.1 | N₂ | 1.0 | 100 | 96 | 87 | 81 | 63 | 55 | 43 | 29 | 19 |
| C. Example 14 | coconut-base | 1450 | 30:9:60.8:0.2 | N₂ | 1.0 | 100 | 95 | 86 | 83 | 70 | 60 | 51 | 37 | 23 |

As seen from Table 5, the performance of palladium chloride-carrying activated carbon sheets depends on the water vapor concentration of the activating gas used, and high performance is obtained with the water vapor concentration being not more than 15%.

TABLE 6

| | | specific surface (m²/g) | cooling gas | PdCl₂ (%) | ethylene (ppm) | hardness (lbs) | sugar (%) | maleic acid (g /100 ml) | taste | Mitsuiri (%) | Yakebyo (%) | browning (%) | core-browning (%) |
|---|---|---|---|---|---|---|---|---|---|---|---|---|---|
| before storage | | | | | | 16.5 | 14.9 | 0.43 | 4.9 | 96 | — | — | — |
| Example 13 | coal base AC. | 1300 | N₂ | 1.0 | 1.1 | 16.3 | 14.9 | 0.38 | 4.7 | 78 | 2 | 0 | 0 |
| C. Example 15 | coal base AC. | 1300 | air | 1.0 | 23.5 | 14.5 | 14.4 | 0.15 | 2.5 | 13 | 65 | 35 | 43 |
| Example 14 | C. Ex. 1, heat treat 700° C., N₂ + CO₂ | 1300 | N₂ | 1.0 | 0.9 | 16.1 | 15.0 | 0.36 | 4.6 | 76 | 3 | 1 | 0 |
| Example 15 | C. Ex. 1, heat treat 900° C., N₂ + CO₂ | 1300 | N₂ | 1.0 | 1.3 | 16.2 | 14.9 | 0.35 | 4.6 | 72 | 2 | 0 | 1 |
| C. Example 16 | commercially available AC. | 1500 | air | — | 55.6 | 14.7 | 14.6 | 0.13 | 2.2 | 0 | 72 | 28 | 32 |
| C. Example 17 | commercially available AC. | 900 | air | 1.0 | 39.5 | 14.3 | 14.5 | 0.19 | 2.4 | 6 | 59 | 33 | 46 |

Note)
AC: activated carbon.

In Table 6, Examples 14–15 and Comparative Examples 15–17 each used an activated carbon carrier prepared under different conditions and the resulting sheets were tested in the same manner as in Example 13. Comparative Example 16 used a commercially available activated carbon carrier obtained by the usual process and having specific surface area of 1500 m²/g, as it was without palladium chloride, and Comparative Example 17 used another commercial activated carbon sheet with 1% of palladium chloride carried thereon.

The palladium chloride-carrying activated carbon sheets according to the present invention (Examples 13-15) all removed ethylene completely in a short period of time, thus showing excellent removing capability. On the other hand, as shown in Comparative Examples 15-17, sheets utilizing the activated carbon carrier other than those of the present invention and commercially available activated carbon all had a low rate of ethylene removal. In particular, one comprising the commercially available activated carbon sheet, having a small specific surface area, had a small oxidation catalytic activity even with palladium chloride carried thereon.

grape grains dropped during storage period and the weight of total grapes, and the simple term "de-graining" ratio means the ratio (%) between the weight of grape grains dropped by a test carried out after the storage test, which comprises 10 times of shaking right and left at a constant amplitude and frequency, and the weight of total grapes.

TABLE 7

| | activated carbon | binder (fiber) | | | flexural strength (kg/cm²) | ethylene (ppm) | Ohrin | | spinach | | Kyoho | |
|---|---|---|---|---|---|---|---|---|---|---|---|---|
| | | (%) | | diameter (μm) | | | core-browning (%) | maleic acid (g/100 ml) | vitamin-C retention (%) | sugar retention (%) | natural degrain-ing (%) | degrain-ing (%) |
| before storage | | | | | — | — | | 0.25 | 100 | 100 | 0 | 0 |
| Example 16 | coal base | PE | 10 | 18 | 1.0 | 0.3 | 5 | 0.22 | 90 | 85 | 1.3 | 9.8 |
| Example 17 | coconut base | PE/PP | 15 | 15 | 1.2 | 0.6 | 6 | 0.23 | 87 | 90 | 1.1 | 7.9 |
| C. Example 18 | coal base | PE | 10 | 100 | 0.15 | 0.4 | 11 | 0.18 | 63 | 53 | 1.0 | 10.3 |
| C. Example 19 | coconut base | PE/PP | 15 | 50 | 0.2 | 0.5 | 10 | 0.19 | 72 | 49 | 1.6 | 9.9 |
| Example 18 | coal base | PP | 5 | 8 | 0.9 | 0.3 | 3 | 0.20 | 86 | 79 | 0.9 | 10.1 |
| Example 19 | coal base | PE/PET | 5 | 10 | 0.9 | 0.5 | 5 | 0.21 | 91 | 85 | 1.4 | 9.5 |
| Example 20 | coal base | PE/nylon | 3 | 25 | 0.8 | 0.4 | 4 | 0.22 | 84 | 82 | 1.2 | 10.0 |
| C. Example 20 | coal base | PP | 40 | 8 | 1.5 | 11.5 | 12 | 0.15 | 65 | 39 | 2.9 | 25.6 |
| C. Example 21 | coal base | PE/PET | 40 | 10 | 1.5 | 8.9 | 11 | 0.16 | 70 | 44 | 4.5 | 21.3 |
| C. Example 22 | coal base | SBR latex | 30 | — | 0.5 | 9.8 | 13 | 0.16 | 68 | 47 | 5.1 | 22.8 |

Note)
PE: polyethylene fiber. PE/PP: polyethylene polypropylene conjugate fiber. PP: polypropylene fiber. PE/PET: polyethylene polyethylene terephthalate conjugate fiber. PE/nylon: polyethylene nylon conjugate fiber. SBR latex: styrene buthadiene rubber latex. Ohrin, Kyoho: a kind of apple respectively.

As shown in Table 7, the palladium chloride-carrying activated carbon sheets of the present invention all had a high oxidation catalytic activity and high flexural strength. On the other hand, those utilizing a binder fiber having a diameter of at least 30 μm had too low a strength to be usable for practical purposes, and those utilizing at least 20 parts of binder had marked decreased ethylene removing rate and only a small freshness keeping effect.

Examples 16-20 and Comparative. Examples 18-22

Example 1 was repeated except that the type of activated carbon and the diameter and mixing ratio of synthetic fibers as binder were changed as shown in Table 7, to obtain palladium chloride-carrying molded activated carbon sheets.

10 gram of each of the sheets thus obtained was attached to the ceiling of a 40-liter plastic box. In each of these boxes, 5 kg of OHRIN apples, 500 g of spinach and 3 kg of KYOHO grapes. These boxes were place in a refrigerating room kept at a temperature of 5° C. The cover of each box was opened and closed 3 times in the morning, 3 times in the daytime and 10 times during night, and the ethylene concentration of the boxes was measured. The results and quality evaluations are shown in Table 7. Comparative Example 22 used as binder an SBR latex instead of synthetic fibers.

In Table 7, the term "natural de-graining ratio" of KYOHO means the ratio (%) between the weight of Examples 21-22 and Comparative Examples 23-24

Example 1 was repeated except that the temperature at which each of the carbons activated was, after cooling, taken out into air, to obtain activated carbons. The activated carbons were permitted to carry 1% of palladium chloride in the same manner as in Example 1 and then molded, with 5 parts of PE/PP (polyethylene/-polypropylene) conjugate fibers having a diameter of 15 microns as binder, into sheets. Each of the obtained palladium chloride-carrying activated carbon sheets was placed together with 10 kg of SHINSUI pears in a 50-liter plastic box. After 3 weeks, the ethylene concentration and quality of the fruit were measured.

Here, Example 22 used the activated carbon sheet as packed in a nonwoven bag having a high gas permeability. The results of the test and specifications of the samples are shown in Table 8.

In Table 8, the color of the pears was evaluated by 5-stage rating, with 5 representing ripened yellow and 1 black

TABLE 8

| | activated carbon | specific surface (m²/g) | activation gas | cooling gas | PdCl₂ (%) | Temp. taken out in air (°C.) | evaluation of pears (Shinsui) | | | | | |
|---|---|---|---|---|---|---|---|---|---|---|---|---|
| | | | | | | | ethylene (ppm) | color, pulp | pulp, weted pulp (%) | roten core (%) | roten stalk (%) | spoilage (%) |
| C. Example 23 | coal base AC. | 1450 | LPG | N₂ | 1.0 | 400 | 1.5 | 3.4 | 53 | 20.5 | 65 | 10.5 |

TABLE 8-continued

|  | activated carbon | specific surface (m²/g) | activation gas | cooling gas | PdCl₂ (%) | Temp. taken out in air (°C.) | evaluation of pears (Shinsui) | | | | | |
| --- | --- | --- | --- | --- | --- | --- | --- | --- | --- | --- | --- | --- |
|  |  |  |  |  |  |  | ethylene (ppm) | color, pulp | pulp, weted (%) | roten core (%) | roten stalk (%) | spoilage (%) |
| C. Example 24 | coconut base AC. | 1450 | combust. gas LPG-combust. gas | N₂ | 1.0 | 350 | 1.3 | 3.3 | 38 | 13.4 | 70 | 9.8 |
| Example 21 | coal base AC. | 1450 | LPG-combust. gas | N₂ | 1.0 | 300 | 0.2 | 2.8 | 25 | 7.0 | 41 | 3.7 |
| Example 22 | Ex. 21, packed in nonwoven bag | 1450 | LPG-combust. gas | N₂ | 1.0 | 300 | 0.2 | 2.8 | 26 | 7.5 | 40 | 3.8 |

Note:
AC.: activated carbon. LPG: liquefied petroleum gas. combust. gas: combution gas. Shinsui: a kind of pear.

discoloration and expressed in terms of the average.

As is understood from Table 8, the performance of the palladium chloride-carrying activated carbon sheets depends on the temperature at which the carbons having been activated and cooled contact air for the first time. The ethylene removing capability decreases to a large extent with the temperature exceeding 300° C. Example 22, using the freshness keeping sheet of Example 21 as packed in a nonwoven fabric bag having a high gas permeability gave almost the same results as those of Example 21.

Example 23 and Comparative Examples 25–27

Activated carbons obtained in activating gases having different compositions were permitted to carry palladium chloride in the same manner as in Example 1 and then molded with 10 parts of PP/PET conjugate fibers having a diameter of 10 microns, into sheets. In a vegetables and fruits section of a refrigerator filled with 5 kg of SUDACHI citron made in Tokushima Prefecture, 10 g of each of the sheets thus prepared was placed and stored for 3 months, and the ethylene concentration and fruit quality were measured.

The results and specifications of the activated carbons used are shown in Table 9. The color of SUDACHI was evaluated by 5-stage rating, with 5 representing fresh green and 1 discoloration to yellow, and expressed in terms of the average.

As seen from Table 9, the performance of the palladium chloride-carrying activated carbon sheets depends on the water vapor concentration of the activating gas used, and high performance is obtained with the water vapor concentration being not more than 15%.

Obviously, numerous modifications and variations of the present invention are possible in light of the above teachings. It is therefore to be understood that within the scope of the appended claims, the invention may be practiced otherwise than as specifically described herein.

What is claimed is:

1. A freshness keeping sheet comprising:
   100 parts by weight of a palladium chloride-carrying activated carbon obtained by activating a carbon material under an atmosphere containing not more than 15% by volume of water vapor and cooling the activated carbon material to not more than 300° C. under the same atmosphere and then permitting the resulting activated carbon to carry 0.1 to 10% by weight of palladium chloride, and
   1 to 20 parts by weight of a synthetic fiber having a single fiber diameter of 1 to 30 μm as a binder, said palladium chloride-carrying activated carbon and said synthetic fiber having been mixed and integrally molded into a sheet.

2. A freshness keeping sheet comprising:
   100 parts by weight of a palladium chloride-carrying activated carbon obtained by heat treating an activated carbon obtained by the usual process or a used activated carbon with decreased oxidation catalytic activity, at a temperature of at least 500° C. under an atmosphere of nitrogen and/or carbon dioxide containing substantially no oxygen or water vapor, cooling the heat treated activated carbon to not more than 300° C. under the same atmosphere and then permitting the resulting body to carry 0.1 to 10% by weight of palladium chloride, and
   1 to 20 parts by weight of a synthetic fiber having a single fiber diameter of 1 to 30 μm as a binder, said palladium chloride-carrying activated carbon and said synthetic fiber having been mixed and integrally molded into a sheet.

TABLE 9

|  | activated carbon | specific surface (m²/g) | activation gas H₂O:CO₂:N₂:O₂ | cooling gas | PdCl₂ (%) | evaluation of citrons (Sudachi) | | | | |
| --- | --- | --- | --- | --- | --- | --- | --- | --- | --- | --- |
|  |  |  |  |  |  | ethylene (ppm) | ratio, damaged (%) | discoloration | sugar (%) | citric acid (%) |
| Example 23 | coconut-base | 1450 | 14:25:60.9:0.1 | N₂ | 1.0 | 0.3 | 0 | 1.3 | 7.8 | 5.7 |
| C. Example 25 | coconut-base | 1450 | 17:22:60.8:0.2 | N₂ | 1.0 | 2.1 | 3.1 | 3.2 | 7.2 | 4.2 |
| C. Example 26 | coconut-base | 1450 | 20:19:60.9:0.1 | N₂ | 1.0 | 3.0 | 3.6 | 3.3 | 7.2 | 4.0 |
| C. Example 27 | coconut-base | 1450 | 30:9:60.8:0.2 | N₂ | 1.0 | 2.7 | 4.1 | 3.2 | 7.2 | 3.9 |

Note:
Sudachi: a kind of citron.

* * * * *